Figure 1:
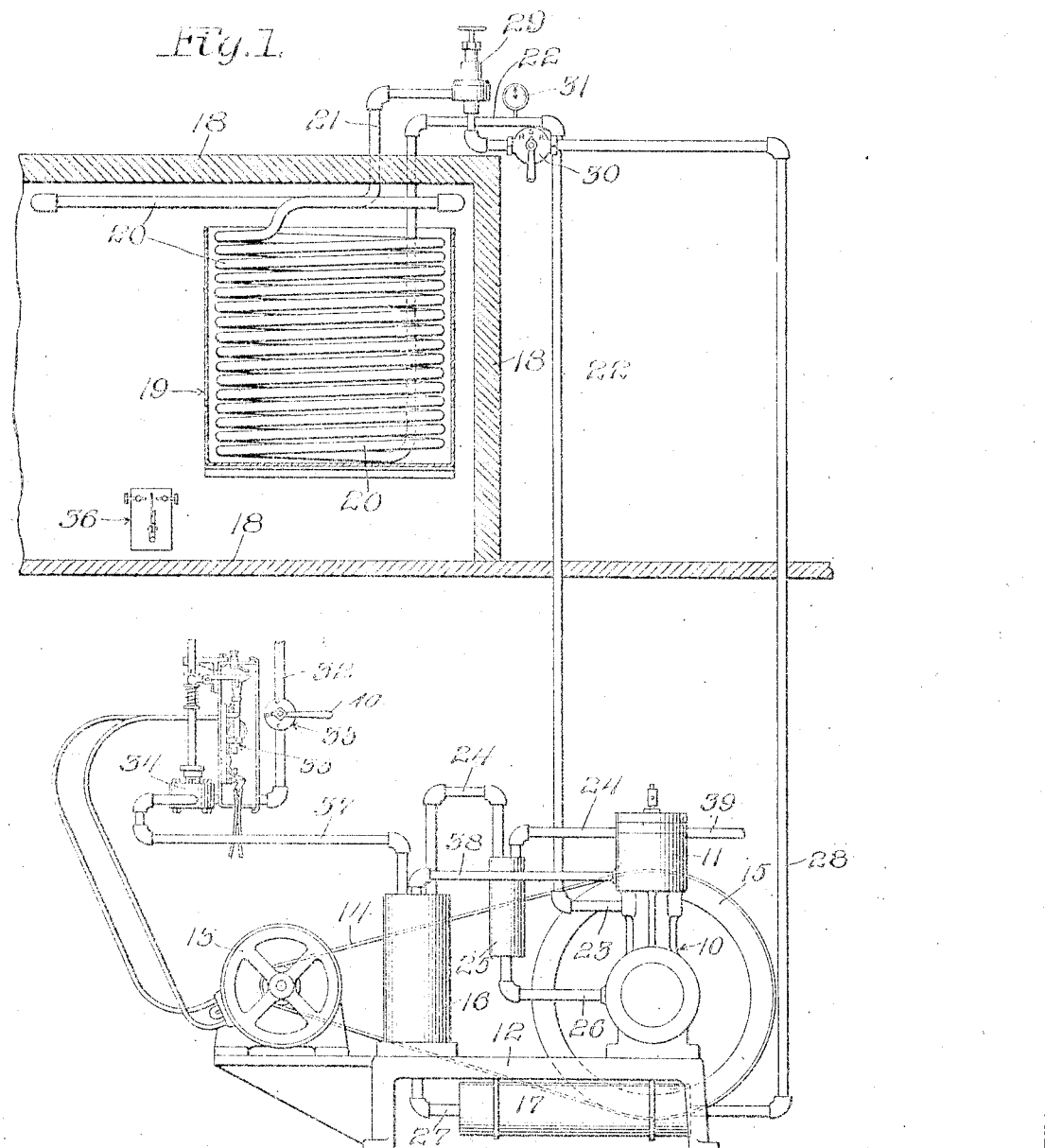

B. S. McCLELLAN.
CONTROL DEVICE FOR REFRIGERATING APPARATUS.
APPLICATION FILED JAN. 4, 1915.

1,194,804.

Patented Aug. 8, 1916.
2 SHEETS—SHEET 1.

WITNESSES:
Harry S. Prather
P. F. Poole

Inventor:
Benjamin S. McClellan
by Charles F. Poole
Atty

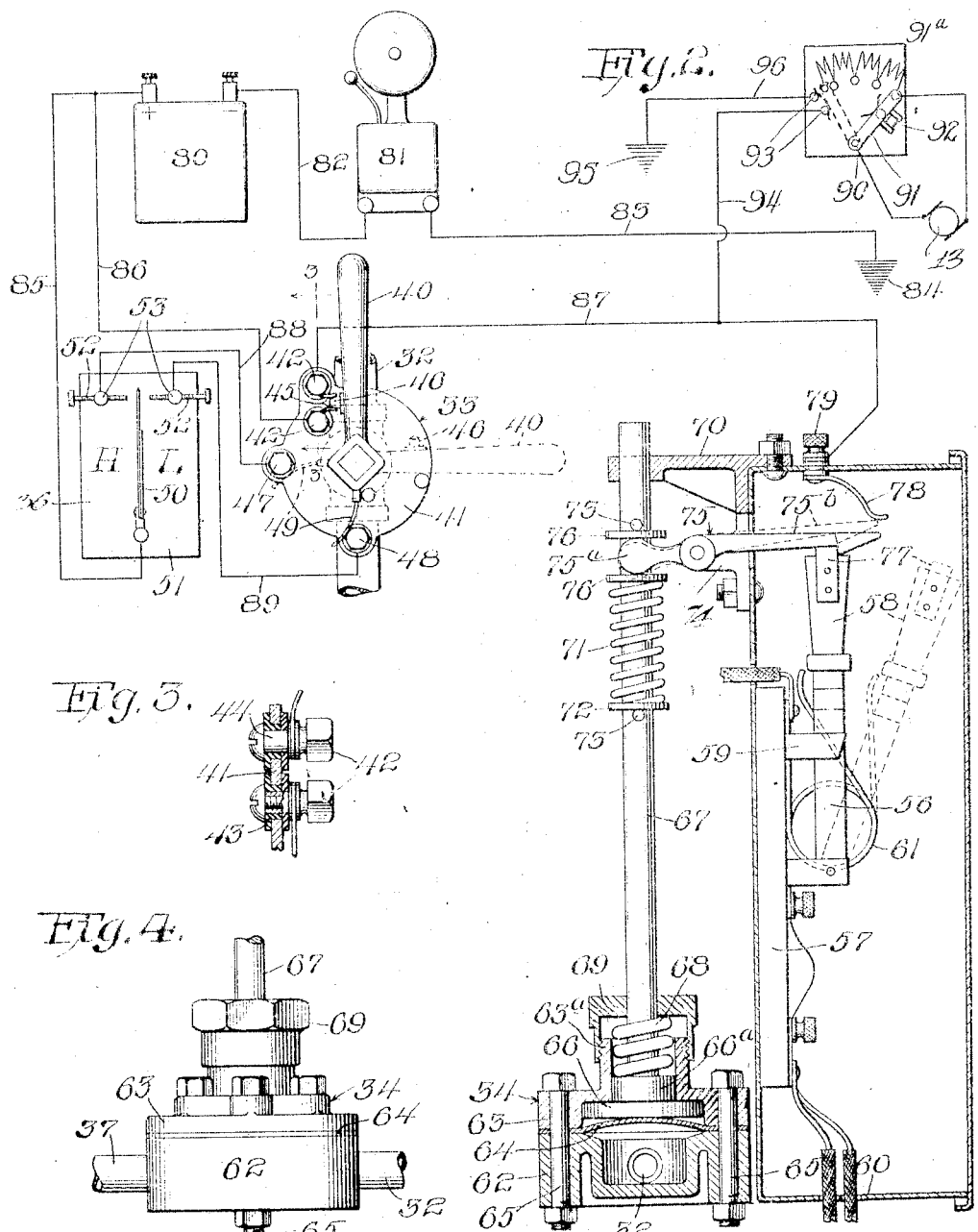

UNITED STATES PATENT OFFICE.

BENJAMIN S. McCLELLAN, OF CHICAGO, ILLINOIS.

CONTROL DEVICE FOR REFRIGERATING APPARATUS.

1,194,304.

Specification of Letters Patent.

Patented Aug. 8, 1916.

Application filed January 4, 1915. Serial No. 352.

*To all whom it may concern:*

Be it known that I, BENJAMIN S. MCCLELLAN, a citizen of the United States, and a resident of Chicago, in the county of Cook and State of Illinois, have invented certain new and useful Improvements in Control Devices for Refrigerating Apparatus; and I do hereby declare that the following is a full, clear, and exact description thereof, reference being had to the accompanying drawings, and to the characters of reference marked thereon, which form a part of this specification.

This invention relates to improvements in controlling or regulating devices adapted for use in connection with refrigerating apparatus, of that character in which the refrigeration is effected by the absorption of heat from the medium to be refrigerated, by the expansion of ammonia from its liquid to gaseous state, and the restoration of the ammonia gas to its liquid state by the removal of the latent heat of the gas through the medium of a heat-absorbing agent, as for instance water.

A refrigerating apparatus comprises as its principal elements an ammonia compressor, refrigerating coils and an ammonia condenser; the compressor serving to compress to a high pressure the ammonia gas discharged from the expansion coils, and the condenser acting to liquefy the gas thus compressed by the removal of the latent heat of the gas. The operation of compressing the gas is accompanied by the generation of an amount of sensible heat equivalent to the work expended by the compressor in compressing the gas, and therefore, to prevent the compressor from becoming overheated, the sensible heat is conducted therefrom by water-jacketing the cylinder of the compressor and supplying a continuous flow of cooling water therethrough. The condensation of the gas to its liquid form also requires the presence of cooling water as an agent for removing the latent heat of the gas. It is therefore apparent that the proper and safe operation of a refrigerating plant is largely dependent upon a constant and certain flow of water through the condenser and water jacket of the compressor, and to such a degree that the operation of the apparatus without the proper supply of water would lead to serious if not dangerous results.

One of the objects of my invention is to provide a device that will automatically shut down or stop the apparatus when the supply of water for any reason fails. This device comprises in general a pressure-controlled valve in the water supply pipe, and connected with an electric switch adapted to control the current supply to the motor of the compressor, said valve and switch being so arranged as to automatically throw out the switch and to stop the compressor, when the flow of water is interrupted or stopped.

A further feature in connection with the automatic switch release is the provision of an electric alarm or signal system, which operates at the instant the compressor stops, and serves to notify the operator of the conditions, in order that proper steps may be taken to make repairs.

A further object of my invention is to provide a signal or alarm device in connection with a temperature-controlled or thermostatic unit mounted in the space to be refrigerated, this device being adapted to notify the operator when the temperature of the refrigerating space has reached the maximum and minimum degrees of temperature, as are determined by regulation of said thermostatic unit. By this arrangement the apparatus is automatically stopped by the interruption of the water supply, and the operator immediately notified, by an alarm, of the conditions, and, by means of the same alarm, the operator may know when to start or stop the apparatus and to thereby increase or decrease the temperature within the refrigerating space, as the case may be.

The features embodied in my invention consist in the matters hereinafter described and fully illustrated in the accompanying drawings, in which—

Figure 1 is a diagrammatic representation of a refrigerating apparatus embodying the features of my invention; Fig. 2 is an enlarged, detail view showing the automatically controlled switch in section, the water supply valve in elevation, and a diagrammatic representation of the electrical elements and connections with said switch and valves; Fig. 3 is a detail section, taken on line 3—3 of Fig. 2, showing the construction of the insulated terminals of the water supply valve; and Fig. 4 is a detail view of the pressure-controlled valve in elevation.

Referring first to the arrangement of a refrigerating apparatus to which my invention is particularly applicable, the compressor 10 is of the usual type, having a cylinder 11 provided with a water jacket. The compressor is shown in Fig. 1 as mounted upon a suitable base 12, which supports also a motor 13 in driving connection with the compressor by means of a belt 14 passing from the driving pulley of said motor, about the fly-wheel 15 of the compressor. Mounted upon the base 12 is an ammonia condenser 16, and supported beneath the base is a liquid ammonia tank 17. The arrangement of piping in connection with the condenser and ammonia tank will hereinafter be fully described. The refrigerating space is shown in Fig. 1 as surrounded by walls 18, and may represent any compartment or space adapted to be maintained at a low temperature, as for instance a small household refrigerator or even a large cold storage room the walls of which are properly insulated. Within the refrigerating space is mounted a tank 19 adapted to contain a brine solution, and a series of expansion coils 20, a portion of which are contained and immersed within the brine of the tank 19. These coils may be of any desired form, although shown herein as comprising one portion of several horizontal turns located in the upper portion of the refrigerating space, and the other portion consisting of spirally arranged coils within the tank 19. The coils form a continuous passage for the ammonia gas, which enters the coils through the pipe 21 and leaves the same through the pipe 22, the latter extending downwardly and communicating with the inlet side of the compression chamber of the compressor cylinder at 23, said pipe being properly termed the suction return pipe, as will hereinafter appear. Communicating with the discharge side of the compression chamber of said compressor, is a pipe 24 which extends to the condenser 16, entering the upper end of the ammonia condensing chamber thereof. The pipe 24 conducts the compressed ammonia gas from the compressor to the condenser, and, in order to remove any oil that may be suspended in or carried by said gas, there is preferably provided an oil separator 25 of any suitable construction and provided with a return or drain pipe 26 communicating with the crank case of the compressor. The lower end of the ammonia condensing chamber of said condenser 16 communicates with the liquid ammonia tank 17, by the pipe 27, said tank being the storage tank for the supply of liquid ammonia. A pipe 28, known as the liquid ammonia pipe, extends vertically upward, and is connected with an expansion valve 29, which is also connected with the pipe 21 leading to the expansion coils 20. The expansion valve, which may be of any desired construction, is adapted to admit a small quantity of the liquid ammonia into the expansion coils 20, thereby affecting the expansion of the ammonia to its gaseous state, as will hereinafter appear. The pipe 28 is provided with a shut-off valve 30, located adjacent to the expansion valve 29, the same being a two-way, hand-operated valve, adapted to be used to shut off the supply of liquid ammonia to the expansion coils, when desired. For convenience, said valve 30 is provided with a dial having the "running" and "stop" positions indicated thereon, and a pointer upon the handle, to indicate the position of the valve. A pressure gage 31 is preferably provided in the return suction pipe 22, as shown.

The water supply enters the apparatus through the pipe 32, and passes first through a hand-operated, shut-off valve 33, hereinafter to be fully described, and from thence through the pressure-controlled valve 34, operatively connected with an electric switch 35. The details of construction of these members will hereinafter be more fully described in connection with the alarm device, the shut-off valve 33, and the electrical connections between these members, and with the thermostatic unit or thermostat 36 mounted within the refrigerating space. The water supply passes through the casing of said pressure-controlled valve 34, and from thence is conducted to the ammonia condenser 16, by means of the pipe 37. The condenser comprises a closed tank or receptacle, through which the water and ammonia gas are passed, the water and gas being preferably conducted through separate passages or conductors, thereby permitting the removal of the heat from the gas without the mixing of the two elements. The cooling water leaves the condenser through a pipe 38, which communicates with the lower portion of the water jacket of the compressor cylinder 11, and is discharged therefrom through the pipe 39, which is connected with the upper portion of said jacket and communicates with the sewer or other place of disposal.

A clear understanding of the operation of a refrigerating system may be had from the following description, with reference to the arrangement of the members and piping before set forth, and disregarding the features embodied in my invention. Assuming the apparatus to be in operation, a quantity of liquid ammonia under pressure is forced from the tank 17, through the pipe 28, to the expansion valve 29. The liquid ammonia passes through a small orifice in the expansion valve, and is immediately expanded into its gaseous form by reason of the decreased pressure on the discharge side of said orifice, due to the suction in the pipe 22, as will hereinafter appear. The transformation of the ammonia from its liquid to gaseous state is accompanied by a great reduction in temperature by reason of the utilization or absorption of the latent heat of the liquid during the vaporization process. The gaseous ammonia at an extremely low temperature enters the expansion coils 20—which are surrounded by the air within the refrigerating space and brine within the tank 19—the sensible heat of said surrounding medium being drawn therefrom and absorbed by the ammonia gas. The gas at a somewhat higher temperature, by reason of the absorption of heat from the surrounding medium of the coils, is drawn from the expansion coils through the return pipe or suction line 22, by the suction created by the compressor, said gas being drawn into the compressor and compressed to a high pressure and discharged into the condenser 16. The suction thus produced by the compressor also acts to maintain a low pressure within the coils, thus accounting for the expansion of the liquid ammonia to its gaseous state through the agency of the expansion valve. The contact of the gas with the cooler surface of the passage conducting the cooling water through the condenser, effects the condensation or liquefaction of the highly compressed gaseous ammonia, the latent heat of liquefaction of the gas being expended and absorbed by the water. From the condenser, the cooling water, now at a higher temperature, is conducted through the pipe 38 to the water jacket of the compressor, the heat of compression being thereupon absorbed by the water which is discharged at a high temperature through the pipe 39 into the sewer as before stated. The ammonia, having been condensed to its liquid state within the condenser, passes from the same into the liquid ammonia tank 17 through the pipe 27, to again cycle through the system in the same manner as before described. It is to be noted that the constant circulation of the ammonia liquor and gas is promoted and maintained by the suction produced in the suction line 22, by the compression of the gas by means of the compressor, which creates the low pressure necessary for the expansion of the liquid ammonia to its gaseous state upon its entrance into the refrigerating coils, and effects also the flow of the liquid ammonia from the liquor tank 17.

Referring now to the devices embodying the features of my invention and constituting an automatic control and alarm system for the apparatus, the same comprises a plurality of independent electric circuits operated by and in conjunction with the water supply valve 33, the pressure-controlled valve and switch 34 and 35, and the thermostat 36 (Fig. 2).

The shut-off valve 33 of the water supply pipe is of the ordinary two-way type, adapted to occupy open and closed positions to shut off and permit the flow of the cooling water in the usual manner. Said valve is provided with a movable valve handle 40 connected with the valve member and preferably mounted so that in the closed position (as shown in dotted lines, Fig. 2) said handle extends transversely of, or at right angles to, the supply pipe 32 or direction of flow. From the closed position, the valve handle is adapted to be moved in a counter-clockwise direction through an angle of 90° to the open position, as shown in full lines in Fig. 2. The valve handle 40 in this position is parallel with the supply pipe 32 or direction of flow of the water.

Supported upon the valve is a disk 41, provided with a plurality of terminals or binding posts adapted to have connected therewith the ends of electric wires or conductors. These binding posts are mounted upon the disk and adjacent to the periphery thereof, in the following manner: At the upper portion of the disk and adjacent to the handle 40 when in open position, are located two binding posts 42, 42, spaced a short distance apart and arranged parallel to the supply pipe 32. These binding posts are insulated from the disk 41 and from each other by the use of insulating bushings 43, of rubber or other suitable material, which surround the stems 44 and extend between the surfaces of the disk and other portions of the binding posts in the usual manner, as shown in Fig. 3. Each of these binding posts is provided with a clip or contact member 45, 45, spaced apart and extending laterally in the direction of the handle 40. These contact members are designed to engage a contact piece 46 mounted upon the handle 40 and insulated from said handle in any suitable manner, said piece 46 being adapted to form a circuit between, or electrically connect, the binding posts 42 by contact with both of the contact members or clips 45, 45 of said posts when the valve handle is moved to open position, and to maintain such electrical connection while the valve is in open position. Spaced from the binding posts 42, 42, at angles of 90° and 180°, respectively, and located at the periphery of the disk on the opposite side thereof from the path of movement of the valve handle 40, are other binding posts 47 and 48, also insulated from the disk in the same manner as before described; the binding post 47 being located in alinement with the valve handle when in closed position (Fig. 2), and the post 48 in alinement with said handle when in open position. These binding posts are designed to have electrical connection with the handle, through the medium of a metal conductor 49, comprising a flexible strip of metal secured to the inner end of the handle. Obviously the contact of this conductor and each of the binding posts 47 and 48, serves to complete a circuit, comprising certain conductors connected with the binding posts and hereinafter to be described, and the supply pipe 32 and other metal parts of the apparatus connected therewith acting as a common conductor or ground circuit for both circuits, as will hereinafter be more clearly brought out. The binding posts 42, 42, have each connected therewith electric wires or conductors forming an electric circuit adapted to be broken or completed when the handle is moved from open to closed position and vice versa. The arrangement of the electric conductors, embracing the several circuits, will hereinafter be described in detail.

The thermostat 36 comprises as its principal elements, a thermal unit 50, consisting of two strips of metal differing in nature and composition and of different lengths, said strips being rigidly secured in contact with each other throughout their lengths, and fixed at one of their ends to a suitable base 51, and in electrical connection at said fixed end with a conductor hereinafter to be described. The upper end of the longer of these strips extends between the ends of two spaced contact members 52, 52, preferably consisting of screws mounted at right angles to said thermal unit 50 within fixed supporting members 53, 53, secured to said base 51, each of said members 53, 53 acting as terminals for wires or conductors to be hereinafter described and constituting parts of independent electric circuits.

The theory of operation of the thermostat is well understood by those familiar with such devices and may be briefly set forth as the effect of a variation of temperatures upon the metal strips comprising the thermal unit, resulting in the expansion of said metals. Since metals differing in composition have different coefficients of expansion or elongation, a variation in temperature will cause said thermal unit to bend one way or the other, by reason of the unequal elongation of the metal strips. Thus when the temperature of the medium surrounding the thermostat is increased, the strips will be bent or distorted and move laterally into contact with one of said contact pieces, and, similarly, a decrease in temperature will effect the bending movement of the metal strips in the opposite direction and into contact with the other contact piece 52. In this manner electrical connection may be made through the medium of the thermal unit with either contact member 52, 52, the same being adjustable to permit contact to take place at various temperatures, predetermined as the maximum and minimum temperature to be maintained within the refrigerating space.

Referring to the pressure-controlled valve and switch (Fig. 2), the switch 35 is of the well known knife type, comprising a pivoted switch lever 56 secured to a base plate 57, and provided with a switch handle 58, adapted to move said lever into and out of engagement with contact members 59. The switch is preferably mounted within a metal switch box 60, into which extend the electric conductors, carrying the current by which the motor 13 of the apparatus is operated. The switch is placed in the power line in the usual manner, and is operated to shut off the current supply to the motor when the switch lever is thrown out to the position shown in dotted lines, of Fig. 2. With the exception of the parts now to be described, the remaining features of construction of the switch are similar to the well known forms, and hence need not be described in detail.

Mounted upon the base plate 57 is a coiled spring 61, comprising one or more turns of stout wire, the free end of which bears against the upper portion of the switch-lever 56 adjacent to the handle 58. This spring constantly exerts a force on the switch-lever, sufficient to throw the switch out of contact with the contact members 59 of the switch, unless the same is retained by an opposing force.

The pressure-controlled valve 34 is mounted adjacent to the switch and exterior to the switch box 60, there being provided suitable supporting means. The pressure-controlled valve comprises the following parts: A valve casing, consisting of two parts 62 and 63, provides a chamber, within which is mounted a diaphragm 64 of a suitable flexible material secured at its margin between the members 62 and 63 of the casing; said members being joined together and the diaphragm clamped between them by means of bolts 65 extending through said members 62 and 63. Communicating with the chamber formed by said casing, and below the diaphragm, are the supply pipes 32 and 37, the water entering the casing from one side thereof, through said pipe 32, and leaving from a point diametrically opposite, by means of pipe 37, as shown in Fig. 4. On the opposite side of the diaphragm, and mounted in the casing, is a movable pressure block 66 in contact with the diaphragm and rigidly secured to the lower end of a valve stem 67. The valve stem and a cylindric neck portion 66ª of the block 66, project upwardly through an opening in the upper member 63 of the casing, said opening being surrounded by an annular flange 63ª. Surrounding the lower end of the valve stem is a coiled spring 68, bearing at one end against the upper end of the block 66 and at its other end against a nut 69 having screw-threaded engagement with the annular flange 63ª of the casing member 63, and adapted for adjustment thereon, for the purpose of varying the tension of said spring 68 upon the pressure block. The valve stem 67 extends through the nut 69, and is slidably mounted at its upper extremity in a bracket 70 secured to the upper portion of the switch box 60. At the upper portion of the valve stem is mounted a coiled spring 71, bearing at its lower end against a ring 72, there being provided a stop pin 73 immediately below said ring acting to prevent the downward movement of said spring. Pivotally mounted upon an arm 74, preferably formed integral with the bracket 70, is a lever 75 provided with a forked arm 75$^a$, embracing the valve stem and bearing against rings 76, 76, surrounding the valve stem and interposed between said forked arm and the spring 71 and a second stop pin 73 located above the uppermost ring 76. The lever 75 is also provided with an arm or detent 75$^b$ extending into the switch box 60 and provided at its end with a downwardly facing notch, adapted to engage a suitable projection 77 secured to the handle 58 of the switch. Immediately above the detent is mounted a contact member 78 secured to a terminal or binding post 79 mounted upon and insulated from the top wall of the switch box. The contact member extends downwardly adjacent to the detent 75$^b$, and is adapted to have contact therewith when the detent is moved upwardly in the act of releasing the switch handle 58, as will be pointed out.

The mode of operation and purpose of the valve may be understood from the following: The pressure of the water flowing through the valve casing—under conditions of a uniform water supply—is exerted upon the diaphragm within the casing, which acts upon the valve stem 67 through the pressure block 66, and maintains said valve stem in elevated position, in which position the detent of the lever 75 engages the projection 77 of the switch handle, and holds the same in closed position, thus permitting the electric current to be supplied to the motor. So long as the water supply is constant and the water flows uniformly through the apparatus, the switch will be held in closed position and the apparatus will continue to operate. If the water supply should be interrupted or stopped by closing the water supply valve 33, or by reason of an accident in the main pumping machinery, or for other reasons uncontrollable by the operator, the pressure of the water within the casing will immediately be decreased, permitting the diaphragm to collapse. The action of the spring 68 upon the pressure block 66 forces the valve stem downwardly, at the same time oscillating the lever 75 sufficiently to permit the switch handle to be released by the detent 75$^b$. Under the action of the spring 61, the switch handle is thrown outwardly and the current supply circuit broken, thereby effecting the imediate stopping of the motor and apparatus. The release of the switch handle by the upward movement of the detent 75$^b$ is accompanied by the almost imediate contact of said detent with the contact member 78, for the purpose of completing the circuit of the alarm system, as will be hereinafter pointed out. The function of the spring 71 on the valve stem is to obtain a yielding connection between the lever 75 and said valve stem, thereby permitting said lever to be rotated to move the detent upwardly to allow the switch handle to be locked in closed position, when said valve stem is in its elevated position, as for instance when the switch has been automatically released by the decrease in water pressure, and it is desired to close the switch after the pressure has returned to the normal, or the water supply valve again opened.

Having described the three regulating or controlling members of my device, namely, the shut-off valve 33, the thermostat 36, and the pressure-controlled valve or switch, the arrangement of the several electrical circuits and elements constituting the alarm system operated by said regulating members, is as follows: Referring to Fig. 2, the arrangement of the electrical conductors and elements of the alarm system is shown diagrammatically, and comprises the combination of a battery 80 and a bell 81, or other electrically excited signal device, and a plurality of conductors forming a plurality of circuits, each including said battery and bell, and one or more of the regulating members before described.

In describing the several circuits, it is to be understood that separate signal devices may be used for each circuit, although it is preferred to use but one which serves each of the several circuits in a manner to constitute in effect independent alarm systems.

The battery and bell 80 and 81 are shown as connected in series by the conductor 82 connecting the negative pole of said battery with one of the terminals of the bell, the other terminal of the bell being grounded on the apparatus through the conductor 83, as shown at 84. The positive pole of the battery 80 is connected by a single wire with branch conductors 85 and 86, the conductor 85 leading to the thermostat and connected with the fixed end or lower terminal of the thermal unit 50, the conductor 86 leading from the battery being connected with one of the binding posts 42 of the shut-off valve 33. The other of said posts 42 is electrically connected with the terminal 79 and contact piece 78 mounted on the switch box 60, by means of the conductor 87. A wire 88 connects the left-hand contact member 52 of the thermostat with the terminal 47 of the shut-off valve, said left-hand contact member 52 being hereinafter termed the high temperature terminal of the thermostat, inasmuch as an increased temperature is herein assumed to move the thermal unit 50 into contact with said contact member. Likewise, the other or right-hand contact member is termed the low temperature terminal of the thermostat, in that a decrease in temperature results in the movement of the thermal unit 50 toward and into contact with the said other contact member. The so-called low temperature terminal of the thermostat is connected with the terminal 48 of the valve 33 by the conductor 89. It being remembered that all of the terminals or binding posts upon the valve 33 are insulated therefrom and from each other, the circuits are completed by means of the contact members 49 and 46 mounted on said handle, the contact member 49 serving to connect either terminal 47 or 48 with a common return consisting of the valve, supply pipe 32 and other metal parts of the apparatus, thus completing the ground circuit with the battery and bell through the conductor 83, it being understood that said conductor is grounded on the apparatus as at 84. Referring now to these several circuits and the manner in which each operates, the first to be considered is that including the battery and bell, the conductor 86, the terminals 42, 42 of the water supply valve 33, and the conductor 87 leading to the contact piece of the switch box. Assuming that the apparatus is in operation and the water supply is constant, the valve 33 in the water supply pipe is in open position and the switch is in closed position, as shown in full lines in Fig. 2. In this position of the valve 33, the handle is parallel with the supply pipe 32, and the terminals 42, 42 are electrically connected through the medium of the contact piece 46 mounted on said handle, but since said contact piece is insulated from the handle, the alarm circuit is not closed, hence the bell will not be rung when the valve is in open position, and the water is flowing through the supply pipe under the proper pressure. In order to close the circuit, it is necessary for the detent 75ᵇ to contact with the contact piece 78 adjacent thereto, thereby connecting the conductors on either side of the battery 80, through the ground circuit. The connection between the detent 75ᵇ and contact piece 78 is effected by the downward vertical movement of the valve stem, resulting from the decrease of the water flowing through the valve casing of the pressure-controlled valve 32, in the manner and for the reason hereinbefore pointed out. Therefore, when the water supply is shut off accidentally and without the knowledge of the operator, the motor is automatically stopped by the releasing of the switch, and, at the same time, the alarm bell is rung by the aforesaid closing of the alarm circuit, and the bell continues to ring until the operator closes the water supply valve, thereby breaking the bell circuit by the disconnecting of the terminals 42, 42 from the contact piece 46. It is apparent that this circuit has for its purpose the ringing of the alarm bell only when an accident occurs such as would interrupt or cause the complete cessation of the water supply, it being particularly noted that it does in no way effect or stop the operation of the apparatus inasmuch as this is accomplished through the medium of the pressure-controlled valve actuated by the decrease in pressure, in the manner hereinbefore set forth.

It is to be noted that the pressure-controlled valve operates to shut off the motor in the same manner as described, in the event that the water supply valve is shut off by the operator, but that in this case the alarm is not sounded inasmuch as the circuit is broken by the disengagement of the contact piece 46 of the handle 40 with the clips or contact members 45, 45. Obviously the failure of the alarm bell to sound is quite proper, since the stopping of the machine is in this case an act of the operator.

The pressure-controlled valve remains in its switch-releasing position so long as the water supply is stopped, for the reason that the spring 68 acting on the pressure block 66 holds the valve stem in its lower position, thereby preventing the detent from being lowered into position to engage the switch handle. Therefore, unless the water supply is resumed, the switch cannot be thrown in to start the motor, for the reason that the spring 61 prevents the switch from being retained in closed position.

Referring now to the circuits comprising the thermostat, the alarm bell and water supply valve 33, these are adapted to sound the alarm when the temperature within the refrigerating space has reached the predetermined high or low temperatures whereupon the apparatus would be started, in the instance that the high temperature is reached and stopped when the low temperature is obtained. These circuits comprise several conductors and electrical elements in common, namely, the battery and bell 80 and 81 with the ground conductor 83, the conductor 85, connecting the battery with the thermal unit, and the ground return through the metal parts of the apparatus. The high and low temperature alarm circuits consist, in combination with the conductors and elements before mentioned, of the conductor 88 connecting the terminal 52 on the high temperature side of the thermostat with the terminal 47 of the valve 33, and the conductor 89 connecting the low temperature side of the thermostat with the terminal 48 of said valve. Assuming that the temperature within the refrigerating space has been reduced to the desired temperature, and the apparatus has been shut down by the closing of the water supply valve, which, as before stated, effects the automatic throwing out of the motor switch, the water supply valve is in closed position, and the handle thereof is at right angles to the supply pipe and the contact member 49 of said handle is in contact with the terminal 47 on said valve, as shown in dotted lines in Fig. 2. In this position of the valve handle, the high temperature alarm circuit is completed or closed, with the exception of the gap between the thermal unit 50 and the high temperature contact member 52 of the thermostat. Under conditions of non-operation of the refrigerating apparatus, the temperature within the refrigerating space will gradually increase until the thermal unit is moved into contact with the high temperature contact member, thereby completing the circuit, with the result that the bell 82 will ring and continue to do so until the circuit is broken by opening the water supply valve in the act of starting the apparatus, in which position the handle 40 of the valve is parallel with the supply pipe and the contact piece 49 is in contact with the terminal 48 (as shown in full lines, Fig. 2). The operation of the apparatus obviously lowers the temperature within the refrigerating space and the thermal unit is moved toward the low temperature contact member 52 of the thermostat, and at the instant the predetermined low temperature is reached the contact takes place, thereby completing the circuit and causing the alarm bell to ring, thereby informing the operator that the refrigerating space is sufficiently cold and that the apparatus may now be shut off by closing the water supply valve. The operation of closing the valve under these conditions accomplishes three results, namely, breaks the low temperature circuit, effects the automatic throwing out of the motor switch, and places the high temperature circuit in readiness to be operated when the temperature again reaches the predetermined maximum temperature at which the refrigerating space is to be maintained.

A further feature of my invention, and constituting a part of the alarm device, is shown in Fig. 2, in connection with a starting rheostat ordinarily used in connection with certain types of motors, as for instance a direct current motor. A starting rheostat, as well known to those familiar with electricity, is a device comprising a plurality of resistance coils placed in series in the current supply conductors, and means, ordinarily comprising a movable handle acting to short circuit these resistance coils as the motor is brought up to speed and the load increased. At full load, the resistance is entirely cut out, and the handle is held in position by means of an electro-magnet excited by a shunt circuit of the current supply, thus, when the current is shut off for any reason, the magnet is demagnetized, the handle released and automatically returned to stop position at which the entire resistance is thrown into the line. In Fig. 2 there is shown a representation of such a starting rheostat 90, having a handle 91 adapted to be moved in a clockwise direction to short circuit the resistance coils in the act of starting the motor, and adapted to be held in full load position by means of the electro-magnet 92. Adjacent to the no-load position of the handle, shown in dotted lines, I provide two contact members 93, 93, separated from each other and insulated from the rheostat casing upon which they are mounted. These contact pieces are further located in position to be engaged by a metal connector 91ª, of any suitable construction, mounted upon and insulated from the rheostat handle 91, said connector acting to electrically connect said contact pieces when said handle is in no-load position, that is, when the electric current is shut off. One of said contact pieces is connected by a conductor 94 to the terminal 42 upon the shut-off valve 33, through the conductor 87 with which said conductor 94 is joined, and the other of said contact pieces grounded to the apparatus as at 95 by means of the conductor 96. This circuit includes also the bell and battery circuit, the same being completed by the conductor 86 connecting the battery with the remaining terminal 42 of the shut-off valve 33. The purpose of this portion of the alarm advice may be understood from the following: The starting rheostat is ordinarily placed adjacent to the motor and intermediate said motor and the switch in the power line supplying the current to the motor, in this instance being the water pressure controlled switch 35. It is to be remembered that said switch 35 is only thrown out and the alarm sounded when the water supply ceases. Therefore, in case an accident occurred in the electric current supply, the switch 35 would remain in closed position, the apparatus stop, and the water supply continue, without the operator being notified of the accident by means of the alarm bell. The purpose, therefore, of the alarm circuit, in connection with the starting rheostat, is to sound the alarm in the event of the cessation of the electric current supply to the motor. As before stated, the rheostat handle is released upon the failure of the current supply through the demagnetizing of the handle retaining electro-magnet 92, and is thrown back to no-load position, wherein the metal contact member 130 of said handle closes the alarm circuit through the contact pieces 93, 93, as shown in dotted lines in Fig. 2, thus effecting the ringing of the alarm bell. This notifies the operator that an accident has occurred, and he may then shut off the water supply by means of the shut-off valve 33, and take the necessary steps to restore the current supply. The act of closing the shut-off valve, it will be remembered, opens the alarm circuit by the disengagement of the contact piece 46 of the handle 40 from the contact members 42, 42. In this manner the entire apparatus is shut down, awaiting the restoration of proper operating conditions.

By the construction of the regulating devices and arrangement of the alarm system herein described, a means of control for refrigerating apparatus is obtained, embodying a combined alarm and automatic stopping device for refrigerating apparatus, dependent upon the position of the water supply valve or the pressure of the cooling water supply, and entirely independent alarm systems dependent upon the temperature within the refrigerating space and the condition of the electric current supply, as well as that of the water supply valve. The relation of the positions of the supply valve and the several circuits may be summarized as follows: In the open position of the water supply valve, there are three circuits in readiness to be completed, first, the circuit through the thermostat and the alarm bell, indicating when the temperature has fallen below the predetermined point; secondly, the circuit through the contact member or switch box and the detent operated by the pressure-controlled valve, thereby sounding the alarm bell, to indicate that the apparatus has been stopped owing to the failure of the water supply, and, thirdly, the circuit through the rheostat. In the closed position of the water supply valve, one circuit is in readiness to be completed, namely, the circuit through the high temperature side of the thermostat and the alarm bell, indicating that the temperature within the refrigerating space has risen above the predetermined point and that the apparatus is to be started again.

The advantage secured by the features of the invention is the assurance of safe operating conditions, in that the apparatus is automatically stopped whenever the water supply ceases for any reason whatsoever, and cannot be again started until the water supply is again resumed under proper conditions of flow and pressure. Thus the operation of the refrigerating apparatus is entirely dependent upon the uniformity of flow of the water supply to the condenser and water jacket of the compressor, which, as has been heretofore pointed out, is essential for the operation of the apparatus and the elimination of dangerous conditions resulting from the lack of water for removing the heat generated during the various steps in the process of refrigeration.

A further advantage resides in the arrangement of a plurality of alarm circuits, wherein a single alarm bell is employed and the application of the water supply valve as a means for placing said alarm bell into one or more of the several circuits, depending on whether the water supply valve is open or closed, each of said circuits being adapted to sound the alarm as the conditions of temperature and water pressure require. Thus, under running conditions the alarm bell is sounded to indicate the temperature at which the apparatus is to be stopped, and again rings when it is to be again started to raise the temperature to the required point, in each case the bell having been automatically changed from the high to the low temperature circuit by the closing and opening of the water supply valve. In this manner the machine is capable of being intermittently operated, that is, operated only for such periods of time as to maintain the temperature within the refrigerating space, at the desired point. In the same manner, the manipulation of the water supply valve acts to place the alarm bell in the circuit of the motor switch and starting rheostat, when said valve is open; thus, if the motor switch is thrown out by the failure of the water supply for any reason whatsoever, or the rheostat handle is thrown back by the failure of the current supply, the alarm bell is sounded, and the alarm continued until the supply valve is shut off by the operator, thereby requiring the presence of said operator at the apparatus, with the result that an investigation will be made and the necessary step taken to resume the water supply in the normal condition.

The particular features of construction and arrangement of the regulating and alarm device embodied in my invention may be variously modified without departing from the spirit of my invention, and for that reason I do not wish to be limited, except in so far as specifically pointed out in the appended claims.

Furthermore, I do not wish to be limited in the application of the invention to the particular apparatus herein shown, inasmuch as it is applicable to any apparatus adapted to be controlled by the pressure of a fluid, or an apparatus operated by any means of motive power, as for instance a steam or internal combustion engine, in which case the pressure control valve would be equally well adapted to operate a valve controlling the steam or gasolene supply, as the case may be, or even a switch in electric conductors of the ignition system of an internal combustion engine. So also, the feature of the alarm device in connection with the starting rheostat is applicable with any other electrical device, designed to be operated under conditions of no voltage in the current supply conductors, and which will act to close the alarm circuit upon the cessation of the current supply, in much the same manner as is accomplished by the movement of the handle of the starting rheostat to no-load position.

I claim as my invention:—

1. In a refrigerating apparatus, the combination of a compressor, means for supplying a cooling medium to the apparatus, including a shut-off valve, an alarm circuit arranged to be closed automatically by the cessation of the cooling water supply, and a switch operatively connected with said shut-off valve and adapted to open the alarm circuit upon the closing of said shut-off valve.

2. In a refrigerating apparatus, the combination of a compressor, a motor for operating said compressor, means for supplying cooling water to said compressor, including a shut-off valve, means automatically operated by the variation in pressure of the cooling water to control the supply of motive power to said motor, an alarm circuit arranged to be closed upon the cessation of motive power to said motor and including a switch acting to open said alarm circuit when the cooling water supply is shut off through the medium of said shut-off valve.

3. In a refrigerating apparatus, the combination of a compressor, a motor for operating said compressor, means for supplying cooling water to the appaartus, including a shut-off valve, a switch for controlling the current supply to the motor, means operated by the variation in pressure of the cooling water to open said switch upon the cessation of the water supply, and an alarm device including an electric circuit provided with a switch operated by said shut-off valve and arranged to be closed when said shut-off valve is open; said electric circuit being arranged to be closed to operate said alarm device by the opening of said motor switch.

4. In a refrigerating apparatus, the combination of a compressor, a motor for operating said compressor, a condenser, means for supplying cooling water to said condenser embracing a shut-off valve, a switch for controlling the current supply to said motor, and provided with tension means constantly acting to throw said switch into open position, a member arranged to be actuated by the variation in pressure of the water supply, including a detent adapted to removably engage said switch and normally acting to maintain the said switch in closed position, and an alarm device including an electric circuit arranged to be closed to operate said alarm device, when said valve is operated by the cessation of the water supply to open said switch.

5. In a refrigerating device, the combination of a compressor, a condenser, means for supplying cooling water to said condenser, including a water shut-off valve, an alarm device including an electric circuit provided with a switch operated by said shut-off valve, and arranged to be closed when said valve is open, and means operated by the variation of pressure of said cooling water to operate said alarm device upon the cessation of the water supply.

6. In a refrigerating apparatus, the combination of a compressor, a condenser, means for supplying cooling water to said condenser embracing a shut-off valve, a thermostat within the space to be refrigerated, an alarm device embracing an electric circuit connected with said thermostat, a switch in said alarm circuit operated by said shut-off valve, and arranged to close said alarm circuit when said shut-off valve is in closed position to effect the sounding of the alarm when a predetermined high temperature is reached within the space to be refrigerated.

7. In a refrigerating apparatus, the combination of a compressor, means supplying cooling water to said apparatus, including a shut-off valve, a thermostat within the space to be refrigerated, an alarm device embracing an electric circuit connected with said thermostat, a switch in said alarm circuit operated by said shut-off valve, and arranged to close said alarm circuit when said shut-off valve is in open position to effect the sounding of the alarm when a predetermined low temperature is reached within the space to be refrigerated.

8. In a refrigerating apparatus, the combination of a compressor, a pipe for supplying cooling water to said apparatus, a shut-off valve in said pipe, a thermostat in the space to be refrigerated, adapted to register predetermined high and low temperatures in said space to be refrigerated, an alarm device embracing electric circuits connected with the high and low temperature sides of said thermostat, a switch operated by said shut-off valve and arranged to close the high temperature circuit when said valve is in closed position, and to close the low temperature circuit when said valve is in open position.

9. In a refrigerating apparatus, the combination of a compressor, a pipe for supplying cooling water to said apparatus, a shut-off valve in said water supply pipe, a thermostat in the space to be refrigerated, an alarm device embracing electric circuits connected with said high and low temperature sides of said thermostat, and an electric switch operated by said shut-off valve and arranged to close the high temperature circuit and open the low temperature circuit when said valve is in closed position, and to open the high temperature circuit and close the low temperature circuit when said valve is in open position.

10. In a refrigerating apparatus, the combination of a compressor, means for supplying cooling water to the apparatus, including a shut-off valve, a thermostat in the space to be refrigerated, a switch operated by the variation of pressure of the water supply, an alarm device comprising parallel arranged circuits embracing the high and low temperature sides of said thermostat and a circuit including said pressure operated switch, and means for opening the pressure operated switch circuit and the low temperature circuit of the thermostat when said shut-off valve is closed.

11. In a refrigerating apparatus, the combination of a compressor, means for supplying cooling water to the apparatus, including a shut-off valve, a thermostat in the space to be refrigerated, a switch operated by the variation of pressure of the water supply, an alarm device comprising a low temperature circuit, a high temperature circuit, and a circuit embracing said pressure operated switch, all of said circuits being in parallel, and means for opening said low temperature circuit and the pressure controlled switch circuit and closing said high temperature circuit when said shut-off valve is closed, and for closing said low temperature circuit and switch circuit and opening the high temperature circuit when said shut-off valve is in open position.

12. In a refrigerating apparatus, the combination of a compressor, a motor for operating said compressor, a condenser, means for supplying cooling water to the condenser including a water shut-off valve, a switch for controlling the current supply to the motor, means operated by variations in pressure of the cooling water acting to effect the opening of the current supply switch upon the cessation of the water pressure, an alarm device, and electrically operated means for operating said alarm device, including a switch operated by the water supply valve and which is closed when said valve is in its open position, a switch operated by variations in pressure of the cooling water and which is closed when the said current supply switch is in its open position; said means acting, at times when the water inlet valve is open, to operate said alarm device.

13. In a refrigerating apparatus, the combination of a compressor, a motor for operating said compressor, a condenser, means for supplying cooling water to the condenser including a shut-off valve, a switch for controlling the current supply to the motor, means operated by variations in pressure of the cooling water acting to effect the opening of the current supply switch upon the cessation of the water pressure, a thermostat, an alarm device, and electrically operated means for operating said alarm device, including a switch operated by the water supply valve, and which is closed when said valve is in its open position, a switch operated by variations in pressure of the cooling water and which is closed when the said water supply valve is in its open position; said means operating, at times when said water supply valve is open, to operate said alarm device, either in case the movable member of the thermostat acts on the low temperature contact thereof, or in case the current supply switch is opened by the cessation of the water pressure.

14. In a refrigerating apparatus, the combination of a compressor, a motor for operating said compressor, a condenser, means for supplying cooling water to said condenser, including a shut-off valve, a switch for controlling the current supply to the motor, means operated by variations in pressure of the cooling water, acting to effect the opening of the current supply switch upon the cessation of the water pressure, a thermostat, an alarm device, and electrically operated means for actuating said alarm device including a switch operated by said water supply valve, and which is closed when the said valve is in its closed position; said means operating, at times when the water supply valve is closed, to operate said alarm device when the movable member of the thermostat acts on the high temperature contact thereof.

15. In a refrigerating apparatus, the combination of a compressor, a motor for operating said compressor, a condenser, means for supplying cooling water to the condenser, including a shut-off valve, a switch for controlling the current supply to the motor, means operated by a variation in the pressure of the cooling water, acting to effect the opening of the current supply switch upon the cessation of the water pressure, a thermostat, an alarm device, and electrically operated means for actuating said alarm device, including a switch device operated by the water supply valve, a switch device operated by variation in the water pressure and which is closed when the current supply switch is open and open when said current supply switch is closed; said means being arranged to effect the operation of said alarm device, at times when the water supply valve is in its open position, either in case the thermostat acts on the low temperature side thereof or in case the current-supply switch is opened by cessation of the water pressure, and also to effect the operation of said alarm device at time when the water inlet valve is closed in case the thermostat acts on the high temperature side of the thermostat.

In testimony, that I, BENJAMIN S. Mc-
5 CLELLAN, claim the foregoing as my invention I affix my signature in the presence of two witnesses, this 30th day of December, 1914.

BENJAMIN S. McCLELLAN.

Witnesses:
C. F. POOLE,
EUGENE C. WANN.